(12) United States Patent
Halkosaari

(10) Patent No.: US 8,090,422 B2
(45) Date of Patent: Jan. 3, 2012

(54) ACCESS TO INTERNAL REPLACEABLE COMPONENT

(75) Inventor: Heikki Vilhelmi Halkosaari, Paimio (FI)

(73) Assignee: Nokia Corporation, Espoo (FI)

( * ) Notice: Subject to any disclaimer, the term of this patent is extended or adjusted under 35 U.S.C. 154(b) by 129 days.

(21) Appl. No.: 12/729,415

(22) Filed: Mar. 23, 2010

(65) Prior Publication Data
US 2011/0237312 A1    Sep. 29, 2011

(51) Int. Cl.
H04M 1/00    (2006.01)
(52) U.S. Cl. .................................. 455/575.4; 455/575.1
(58) Field of Classification Search ............... 455/575.4, 455/575.1
See application file for complete search history.

(56) References Cited

U.S. PATENT DOCUMENTS

| | | | | |
|---|---|---|---|---|
| 5,563,005 | A * | 10/1996 | Ohtani et al. | 429/96 |
| 6,014,593 | A * | 1/2000 | Grufman | 700/136 |
| 6,045,398 | A * | 4/2000 | Narita et al. | 439/500 |
| 6,795,304 | B1 * | 9/2004 | Lam | 361/679.14 |
| 7,369,882 | B2 * | 5/2008 | Hwang et al. | 455/575.1 |
| 2003/0211868 | A1 * | 11/2003 | Wu et al. | 455/572 |
| 2004/0254001 | A1 * | 12/2004 | Kakuguchi et al. | 455/575.8 |
| 2005/0250532 | A1 | 11/2005 | Hwang et al. | |
| 2005/0277453 | A1 * | 12/2005 | Kim | 455/575.8 |
| 2007/0129117 | A1 * | 6/2007 | Lee et al. | 455/572 |
| 2010/0331062 | A1 * | 12/2010 | Christensen et al. | 455/575.4 |

OTHER PUBLICATIONS

International Search Report of PCT/FI2011/050029—Date of Completion of Search: May 2, 2011, 4 pages.
Written Opinion of the International Searching Authority of PCT/FI2011/050029—Date of Completion of Opinion: May 2, 2011, 6 pages.

* cited by examiner

Primary Examiner — Charles Shedrick
(74) Attorney, Agent, or Firm — Locke Lord LLP

(57) ABSTRACT

An apparatus including a first body part and a second body part slidingly movable in relation to each other from a compact position to an extended position, a housing configured to receive a replaceable internal part, and a joint mechanism joining the first and second body parts to a third part of the apparatus. The joint mechanism is configured to allow, when the apparatus is in said extended position, the first and second body parts to tilt in relation to said third body part to provide access to the housing.

15 Claims, 3 Drawing Sheets

1

ACCESS TO INTERNAL REPLACEABLE COMPONENT

TECHNICAL FIELD

The present invention generally relates to apparatuses having a first body part and a second body part slidingly movable in relation to each other.

BACKGROUND ART

In electronic devices, such as battery operated mobile handheld devices, the user from time to time has to access the interior of the device.

SUMMARY

According to a first example aspect of the invention there is provided an apparatus comprising:
a first body part and a second body part configured to be slidingly movable in relation to each other from a compact position to an extended position;
a housing configured to receive a replaceable internal part; and
a joint mechanism joining the first and second body parts to a third part of the apparatus, and
the joint mechanism is configured to allow, when the apparatus is in said extended position, the first and second body parts to tilt in relation to said third part to provide access to the housing.

Via the tilting operation, an easy access to the interior of the apparatus is provided. In certain example embodiments, a mechanism combining a sliding and rotational movement of parts in relation to each other is provided in order to provide a mobile apparatus with a smooth exterior surface and easy access to its internal components.

In certain embodiments, the first and second body parts in a sense form a combined part which is configured to tilt in relation to said third part. The third part may be the remaining part of the apparatus. It may be another body part, a bottom part, or a part basically forming a bottom or back cover of the apparatus.

In certain embodiments, the first part comprises a display, and the second part comprises an input device, such as a keypad.

In certain embodiments, the first part forms a top part of the apparatus which is always visible for the user. The second part may be hidden in the compact position but revealed in the extended position.

The apparatus may be an electronic device. It may be a battery operated device. It may be a mobile handheld electronic device. It may be a mobile communication device, such as a cellular mobile station, mobile phone, or similar.

The replaceable internal part (or component) may be an electronic component. It may be a battery. It may be a user replaceable part. It may be an internal module in contrast to replaceable covers or other replaceable part visible when the apparatus is in regular use. It may be an identity module comprising data for identifying the subscriber or user of the device, such as a subscriber identity module (SIM or similar). Alternatively, it may be a memory card. It may be a smart card.

The apparatus may have one or more housings or slots in the interior of the apparatus. In certain example implementations, the apparatus comprises a housing for the battery, and another housing or slot for an identity module, such as SIM, in the interior of the device. A memory card slot may be located on an exterior surface or edge of the apparatus. In certain other example implementations, the apparatus comprises only the battery housing in the interior of the apparatus. In certain other implementations, the apparatus comprises the battery housing, the SIM slot, as well as one or more memory card slots in the interior of the apparatus.

In certain example embodiments, the first and second body parts (or the combined part formed by the first and second body parts) are configured to tilt via rotating movement. The rotating movement may be effected via the joint mechanism. Alternatively, depending on the implementation, the movement causing tilting is established via combined rotational and translational movement via the joint mechanism.

In certain example embodiments, the apparatus is configured to switch off power in response to said first and second body parts (or combined part) tilting.

In certain example embodiments, the apparatus is configured to allow the replaceable internal part to be detachably mounted in a tilting body part. In these embodiments, it is typically the second body part that forms the housing. When the replaceable internal part is mounted or attached into the tiltable part, it may tilt together with the tilting part revealing it for easy access when tilting (for the purpose of replacing it, for example).

In certain example embodiments, the apparatus is configured to provide the replaceable internal part to be removed in a side direction which is parallel to a main outer surface of the first body part, when tilted.

In certain embodiments, the tilting movement of the first and second body parts (or combined part) causes the replaceable internal part to become accessible to the user. In certain embodiments, the apparatus is configured to provide no access to the replaceable internal part in the extended position, if the first and second body parts (or combined part) are not tilted.

According to a second example aspect of the invention there is provided a method comprising:
providing a first body part of an apparatus and a second body part of the apparatus slidingly movable in relation to each other from a compact position to an extended position, a housing configured to receive a replaceable internal part, and a joint mechanism joining the first and second body parts to a third part of the apparatus; and
allowing, when the apparatus is in said extended position, the first and second body parts to tilt in relation to said third part to provide access to housing.

In certain example embodiments, the method comprises switching off power from the apparatus in response to said first and second body parts (or combined part) tilting.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
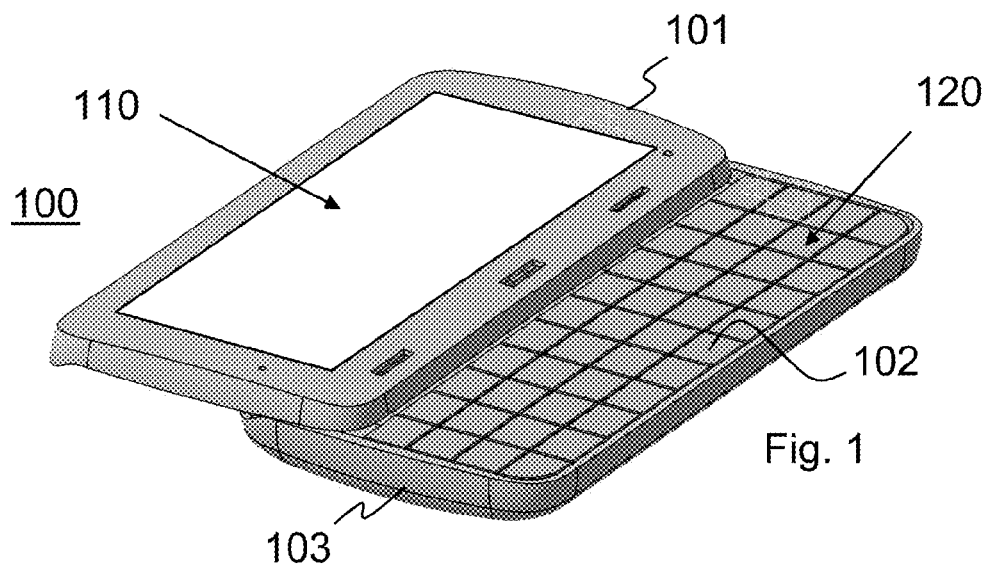
FIG. 1 shows a schematic drawing of an apparatus in an operating position in accordance with an example embodiment.

FIG. 1 shows a schematic drawing of an apparatus in accordance with an example embodiment. In this example, the apparatus 100 is a mobile handheld electronic device. It comprises a first body part 101 and a second body part 102. In an embodiment, the first body part 100 comprises a display 110, and the second body part comprises an input element 120, such as a keyboard or a keypad. The display 110 may be, for example, a top display visible in FIG. 1. It may be touch display. The input element may be, for example, a full qwerty or ITU-T keyboard or a smaller keypad with limited keys. It may be a touch display as well.

The first body part 101 is joined to the second body part 102 with a slide mechanism (not shown) allowing the first body part 101 to slide from a first position (compact position) to a second position (extended position shown in FIG. 1).

The second body part 102 is located within a third part 103 of the apparatus, and the combination of the first and second body parts 102, 103 is joined to the third part 103 with a joint mechanism (not shown in FIG. 1) with functions described in the remaining description. The third part 103 may be another body part, a bottom part, or a cover part basically forming a bottom or back cover of the apparatus 100.

Figure 2:
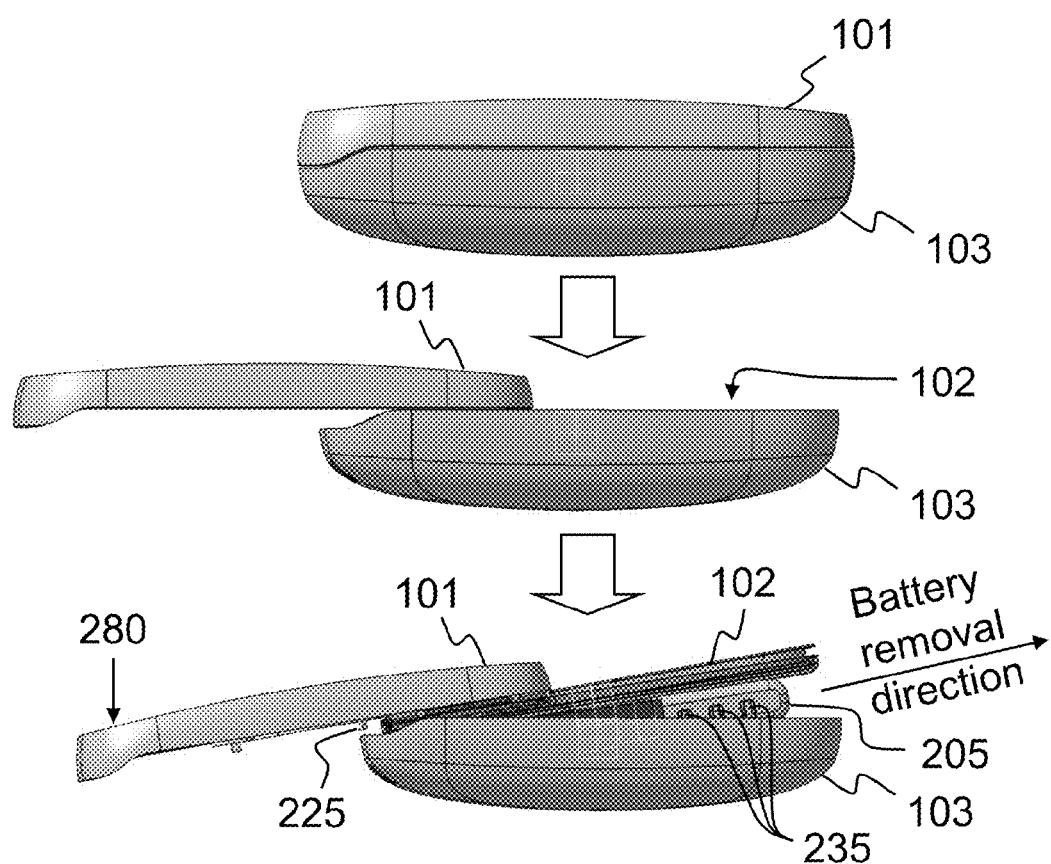
FIG. 2 shows a schematic drawing of the apparatus in three different operating positions in accordance with an example embodiment.

FIG. 2 shows the apparatus of FIG. 1 in three different operating positions in accordance with an example embodiment. In the upper section, the apparatus 100 is in the compact position. The slide between the first and second body parts 101, 102 is closed. The first body part 101 covers the second body part 102. The first body part 101 is visible and usable, while the second body part 102 that faces the first body part 101 is hidden. The apparatus 100 may be powered on.

In the middle section, the apparatus 100 is in the extended position. The slide between the first and second body parts 101, 102 is open. The apparatus 100 may be powered on. In the extended position as well as in the compact position, any replaceable internal parts are not accessible due to the overall structure and formulation of the apparatus.

In the lower section, the apparatus 100 is in a third position (tilted position) revealing the interior of the apparatus 100. In this position, a replaceable internal part 205, such as a battery becomes accessible. The apparatus 100 is powered on or powered off.

The apparatus 100 may provide a removal direction for the replaceable part. In the example embodiment shown in FIG. 2 the user may remove the replaceable part in the side direction shown in the figure. The replaceable part may be flat so that it is easier to replace in a side direction. The side direction may be a tangential direction of the top or main surface of the (typically flat) replaceable part 205. The direction may be a direction that directly (not obliquely) points away from the apparatus 100. The direction may be defined by a direct (virtual) continuation of the replaceable part 205 on the revealed side of the part, or as a direction perpendicular to the surface of the revealed side or side wall.

In the third position, the slide between the first and second body parts 101, 102 is open and the combination of the first and second body parts 101, 102 is tilted with respect to the third part 103 revealing the replaceable part 205. The interior of the apparatus 100 is generally opened in a way resembling the opening of a bonnet. The joint mechanism enabling the opening of the interior of the apparatus 100 is more closely described in connection with FIG. 3.

Movement from the extended position to the third (tilted) position is effected by pressing the first body part 101 on the back edge as depicted by the arrow 280.

The first body part 101 comprises a stopper 225 stopping the tilting movement so that the apparatus does not tilt too much. Alternatively, the second body part 102 or the third part 103 comprises the stopper or a similar arrangement.

In an example embodiment, the apparatus is powered off in the third position. The power of a battery operated apparatus may be automatically switched off in response to the tilting movement.

In an example embodiment, the replaceable internal part (or battery) 205, or the first or second body part 101, 102, comprises electrical contacts 235 and the third part 103 corresponding contacts (not shown). The tilting movement from the extended position to the third position may be arranged to cause the contacts to lose contact with the effect that the entire apparatus or a part of it (for example, power supply to the SIM or similar) becomes unpowered. The identity module can then be removed and/or replaced in a corresponding way as described in the foregoing.

Figure 3:
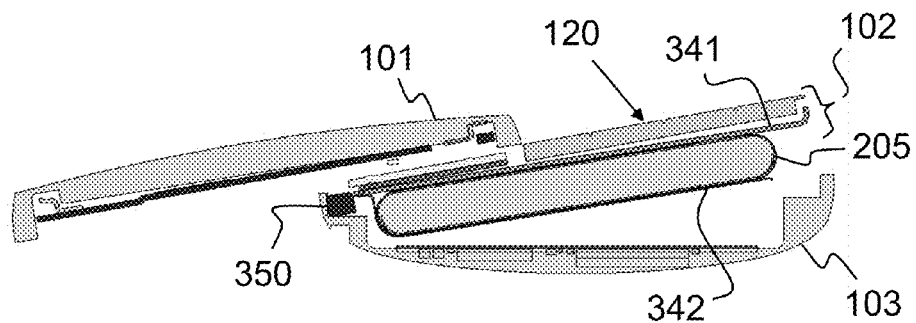
FIG. 3 shows a schematic cross-sectional view of the apparatus in a third operating position in accordance with an example embodiment.

FIG. 3 shows a schematic cross-sectional view of the apparatus 100 in the third operating position in accordance with an example embodiment. For the sake of clarity, the view of FIG. 3 is slightly exploded. In addition to the features shown in FIG. 2, in FIG. 3 there is visible the joint mechanism 350 attached to or forming part of the first and second body parts 101, 102. The joint mechanism 350 joins the combined part formed by the first and second body parts 101, 102 with the third part 103. It allows the combined part to rotate around a rotation axis in relation to the third part 103 so that the interior of the apparatus 100 becomes accessible. Alternatively, depending on the implementation, the movement causing tilting is established via combined rotational and translational movement.

The combined part or the second body part 102 forms a housing for the internal replaceable part 205. In the example in FIG. 3 the housing is formed by a frame comprising an upper wall portion 341 and a lower wall portion 342. However, in other embodiments, a different housing may be implemented. When the apparatus 100 is in the tilted position, the housing is open towards the removal direction.

In an example embodiment, tilting from the extended position to the third position may be controlled by a locking mechanism (not shown). In an embodiment, the apparatus 100 comprises a plurality of locking points on its long side. In an embodiment, there are three locking points: one in the middle and the other two close to the ends. On the exterior surface of the apparatus there may be a switch which may be, for example, of a slider type. The locking mechanism may be released by using the switch. The parts (first and second body parts and the third part) of the apparatus may be spring-loaded in relation to each other so that when the locking mechanism is released the parts turn into an open position. In an embodiment, the locking mechanism does not close again until the user turns the parts back.

Figure 4:
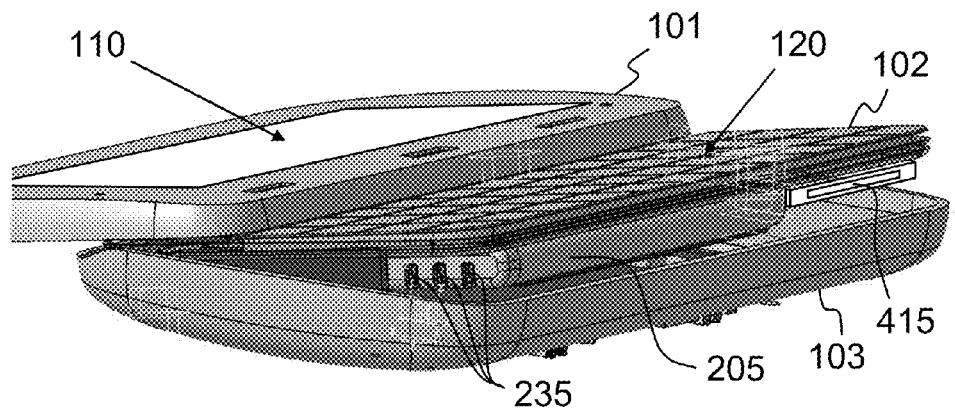
FIG. 4 shows a further schematic drawing of the apparatus in the third operating position in accordance with an example embodiment.

In an example embodiment, the apparatus 100 comprises one or more housings in the interior of the apparatus. FIG. 4 shows the third operating position from a different angle. In addition to the features shown in FIGS. 2 and 3, there is provided another housing 415 for another internal replaceable part. Such a replaceable part may be an identity module (SIM card or similar) or a memory card. The housing 415 may be a card slot to which, for example, an identity module is inserted and from which it can be easily removed when the apparatus is in the third operating position. With the power switch off functionality described in the foregoing, an identity module or memory card may be inserted and removed with power supply to the card slot automatically switched off, if desired. The housing 415 may be a housing located adjacent to or in the continuation of the first housing that houses, for example, a battery. The housing 415 may be a separate housing or located in the same frame as the first housing 315.

Figure 5:
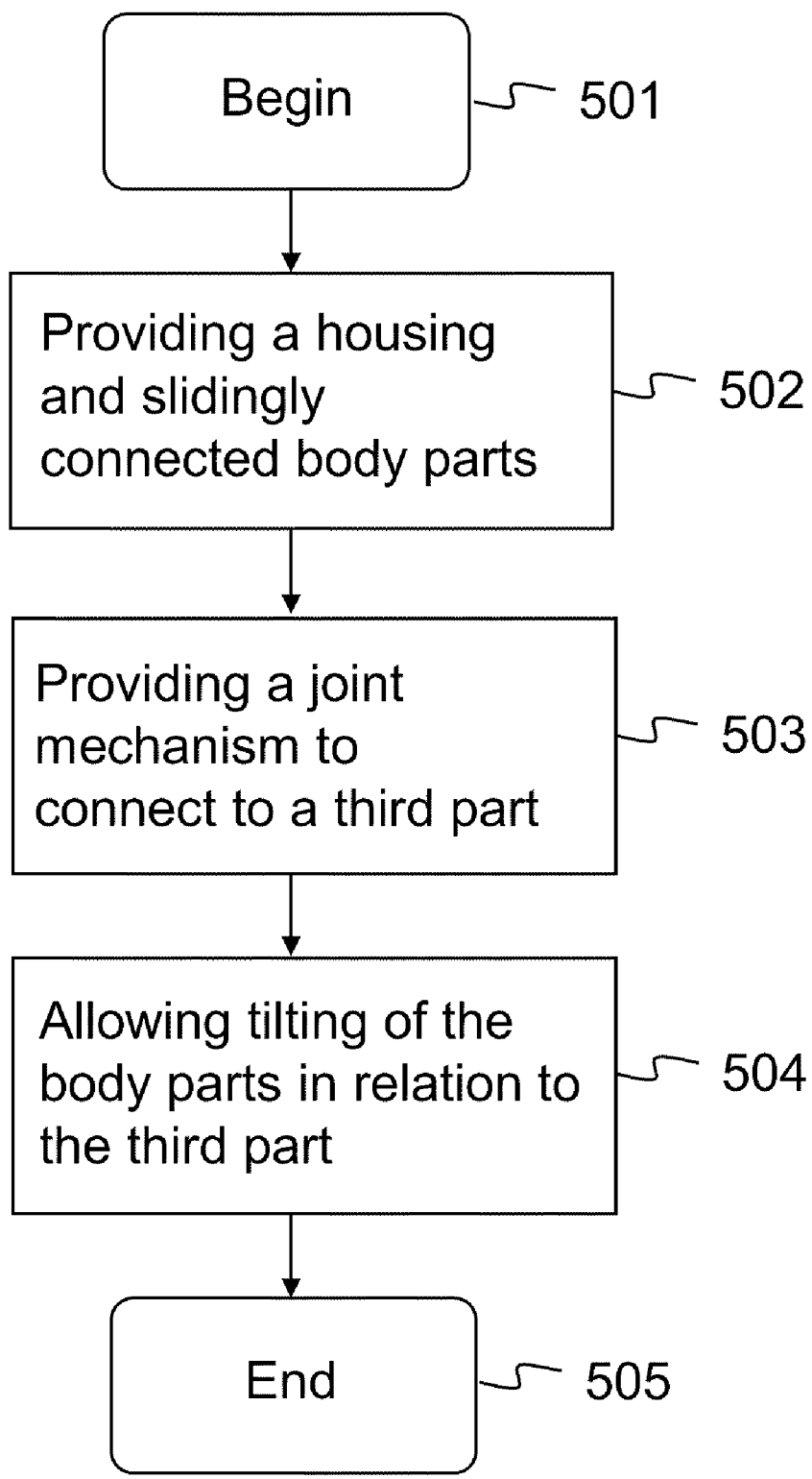
FIG. 5 shows an example flow chart of a method in accordance with an example embodiment.

FIG. 5 shows an example flow chart of a method in accordance with an example embodiment. The method begins at block 501. In block 502 a first body part of an apparatus and a second body part of the apparatus are provided. The body parts are configured to be providing slidingly movable in relation to each other from a compact position to an extended position. A housing configured to receive a replaceable internal part is provided. In block 503, a joint mechanism joining the first and second body parts to a third part of the apparatus is provided. When the apparatus is in the extended position, the first and second body parts are allowed to tilt in relation to said third part to provide access to the housing (block 504). The method ends at block 505. The example method presented in the foregoing is an example only. In other embodiments, different functions in the method may occur in a mutually different order.

Various example embodiments presented in the foregoing may help in designing an apparatus. An apparatus having no separate battery cover may be provided. An apparatus with seamless design may be provided. A user may change a battery and any other applicable user replaceable internal part of the apparatus quite conveniently. An apparatus with no separate SIM door on the exterior surface of the apparatus may be provided. The battery of the device may be switched off while opening the device for internal part replacement. High density component placement may be achieved and a high capacity battery may be located in an optimal position.

When access to a housing and thereby to a replaceable internal part is provided via a tilting operation, there is no need, for example, to remove any back cover for the purpose of replacing the internal part. This may help in constructing compact-sized portable devices which provide an easy access to internal components of the device while keeping the exterior surface of the device very smooth. In various example embodiments, the battery of the device may be replaced easily, and the user may access SIM as well as memory card slots easily, if placed in the interior of the device. In certain example embodiments, the apparatus is configured to switch off power in response to first and second body parts (or combined part) tilting. This may be advantageous for example in the event the internal replaceable internal part is an identity module, such as a SIM card or similar, since this kind of identity modules should typically be replaced only in an unpowered state or with the apparatus unpowered.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
a first body part and a second body part configured to be slidingly movable in relation to each other from a compact position to an extended position; a housing configured to receive a replaceable internal part; and a joint mechanism joining the first and second body parts to a third part that forms a back cover of the apparatus, and wherein the joint mechanism is configured to allow, when the apparatus is in said extended position, the first and second body parts to tilt via the joint mechanism in relation to said third part to provide access to the housing.

2. An apparatus according to claim 1, wherein the first and second body parts are configured to tilt via rotating movement.

3. An apparatus according to claim 1, wherein the apparatus is configured to switch off power in response to the first and second body parts tilting.

4. An apparatus according to claim 1, wherein the apparatus is configured to allow the replaceable internal part to be detachably mounted in a tilting body part.

5. An apparatus according to claim 1, wherein the apparatus is configured to provide the replaceable internal part to be removed in a side direction which is parallel to a main outer surface of the first body part, when tilted.

6. An apparatus according to claim 1, wherein the apparatus is configured to provide the replaceable internal part to be removed in a direction that is a tangential direction of a top or main surface of the replaceable internal part.

7. An apparatus according to claim 1, wherein the apparatus is configured to provide the replaceable internal part to be removed in a direction that is a direct continuation of the replaceable internal part.

8. An apparatus according to claim 1, wherein the apparatus is configured to provide no access to the replaceable internal part in the extended position, if the first and second body parts are not tilted.

9. An apparatus according to claim 1, wherein the replaceable internal part is a battery.

10. An apparatus according to claim 1, wherein the replaceable internal part is an identity module.

11. An apparatus according to claim 1, wherein the replaceable internal part is a memory card.

12. An apparatus according to claim 1, wherein the apparatus is a mobile handheld electronic device.

13. A method comprising: providing a first body part of an apparatus and a second body part of the apparatus slidingly movable in relation to each other from a compact position to an extended position, a housing configured to receive a replaceable internal part, and a joint mechanism joining the first and second body parts to a third part that forms a back cover of the apparatus; and allowing, when the apparatus is in said extended position, the first and second body parts to tilt via the joint mechanism in relation to said third part to provide access to the housing.

14. A method according to claim 13, comprising:
switching off power from the apparatus in response to said first and second body parts tilting.

15. An apparatus according to claim 1, wherein the second body part is located within the third part.

* * * * *